(12) United States Patent
Yamada et al.

(10) Patent No.: US 12,132,426 B2
(45) Date of Patent: Oct. 29, 2024

(54) MOTOR CONTROL DEVICE, MOTOR DRIVE SYSTEM, HYDRAULIC PRESSURE GENERATOR, MOTOR CONTROL METHOD, AND STORAGE MEDIUM

(71) Applicant: MITSUBA Corporation, Gunma (JP)

(72) Inventors: Miya Yamada, Gunma (JP); Kota Fukashiro, Gunma (JP)

(73) Assignee: MITSUBA Corporation, Gunma (JP)

( * ) Notice: Subject to any disclaimer, the term of this patent is extended or adjusted under 35 U.S.C. 154(b) by 355 days.

(21) Appl. No.: 17/536,078

(22) Filed: Nov. 28, 2021

(65) Prior Publication Data
US 2022/0182000 A1    Jun. 9, 2022

(30) Foreign Application Priority Data

Dec. 3, 2020 (JP) ................ 2020-201132

(51) Int. Cl.
*H02P 23/00* (2016.01)
*H02P 23/14* (2006.01)

(52) U.S. Cl.
CPC .......... *H02P 23/0004* (2013.01); *H02P 23/14* (2013.01)

(58) Field of Classification Search
None
See application file for complete search history.

(56) References Cited

U.S. PATENT DOCUMENTS

| | | | | |
|---|---|---|---|---|
| 3,593,078 A | * | 7/1971 | Domshy | H02H 7/0833 318/778 |
| 4,259,845 A | * | 4/1981 | Norbeck | H02P 1/30 318/808 |
| 4,320,332 A | * | 3/1982 | Sugimoto | H02P 23/08 318/803 |
| 4,333,046 A | * | 6/1982 | Lee | H02P 23/26 318/729 |

(Continued)

FOREIGN PATENT DOCUMENTS

| | | | |
|---|---|---|---|
| JP | 2018098861 | | 6/2018 |
| JP | 2018098861 A | * | 6/2018 |

OTHER PUBLICATIONS

Machine Translation of JP 2018098861 (Obtained from USPTO Search) (Year: 2024).*

*Primary Examiner* — Dominick L Plakkoottam
*Assistant Examiner* — Geoffrey S Lee
(74) *Attorney, Agent, or Firm* — JCIPRNET (57) ABSTRACT

A motor control device includes: a target value acquisition part acquiring a target value of a control parameter of a motor; an operation amount calculation part calculating an operation amount; an output acquisition part acquiring an output of the control parameter; and a deviation calculation part calculating a deviation between the target value and the output. The operation amount calculation part includes: a first calculation part calculating a first value corresponding to the deviation; a second calculation part calculating a second value in a range not exceeding a predetermined upper limit value based on an integrated value of the (Continued)

deviation; and a third calculation part calculating the operation amount in a range not exceeding an operation amount upper limit value based on the first and second values. The predetermined upper limit value is larger than a value obtained by subtracting the first value from the operation amount upper limit value.

12 Claims, 9 Drawing Sheets

(56) References Cited

U.S. PATENT DOCUMENTS

| | | | | |
|---|---|---|---|---|
| 4,384,243 A * | 5/1983 | Muskovac | ............ | H02J 3/1892 |
| | | | | 318/729 |
| 4,468,603 A * | 8/1984 | Vander Meer | .......... | H02P 23/26 |
| | | | | 318/729 |
| 5,967,253 A * | 10/1999 | Collier-Hallman | .... | B62D 5/065 |
| | | | | 701/41 |
| 8,674,650 B1 * | 3/2014 | Rabinovich | ................ | H02P 3/18 |
| | | | | 318/434 |
| 2015/0357959 A1 * | 12/2015 | Sunahara | ................ | H02P 27/06 |
| | | | | 318/139 |
| 2020/0252075 A1 * | 8/2020 | Aoki | ....................... | H02P 27/08 |

* cited by examiner

MOTOR CONTROL DEVICE, MOTOR DRIVE SYSTEM, HYDRAULIC PRESSURE GENERATOR, MOTOR CONTROL METHOD, AND STORAGE MEDIUM

CROSS-REFERENCE TO RELATED APPLICATION

This application claims the priority benefit of Japan application serial no. 2020-201132, filed on Dec. 3, 2020. The entirety of the above-mentioned patent application is hereby incorporated by reference herein and made a part of this specification.

BACKGROUND

Technical Field

The disclosure relates to a motor control device, a motor drive system, a hydraulic pressure generator, a motor control method, and a storage medium.

Description of Related Art

In a known motor control technique, PI control is performed so that a deviation between an estimated value (output) of a phase current and a target value of the phase current becomes a predetermined value (see, for example, Patent Document 1: Japanese Patent Application Laid-Open No. 2018-098861).

In feedback control such as PI control, if a state in which the deviation between the target value and the output is relatively large continues for a relatively long period of time, since the I term value (integrated value) may be excessively large, an upper limit value may be set for the I term value in order to prevent this situation. At this time, the upper limit value may be set to, for example, a value obtained by subtracting the P term value at that time from an upper limit value of the operation amount. However, if such an upper limit value for the I term value is used, when the deviation sharply decreases or reverses while the I term value is at the upper limit value, the operation amount responds immediately and tends to decrease within a short time. Such responsiveness of the operation amount may be a factor that causes the rotational speed of the motor to decrease sharply (and accordingly a factor that hinders the realization of the desired rotational state of the motor due to the load).

SUMMARY

An embodiment of the disclosure provides a motor control device including a target value acquisition part, an operation amount calculation part, an output acquisition part, and a deviation calculation part. The target value acquisition part acquires a target value of a control parameter associated with a motor. The operation amount calculation part calculates an operation amount for the motor. The output acquisition part acquires an output of the control parameter outputted from the motor when the motor is driven based on the operation amount calculated by the operation amount calculation part. The deviation calculation part calculates a deviation between the target value acquired by the target value acquisition part and the output acquired by the output acquisition part. The operation amount calculation part includes a first calculation part, a second calculation part, and a third calculation part. The first calculation part calculates a first value corresponding to the deviation calculated by the deviation calculation part. The second calculation part calculates a second value in a range that does not exceed a predetermined upper limit value based on an integrated value obtained by integrating the deviation over time. The third calculation part calculates the operation amount in a range that does not exceed an operation amount upper limit value based on the first value calculated by the first calculation part and the second value calculated by the second calculation part. The predetermined upper limit value is larger than a value obtained by subtracting the first value calculated by the first calculation part from the operation amount upper limit value.

DESCRIPTION OF THE EMBODIMENTS

According to the embodiments of the disclosure, it is possible to prevent the rotational speed of a motor from sharply decreasing even if a state in which the deviation between the target value and the output is relatively large continues for a relatively long period of time and then the deviation sharply decreases or reverses.

Hereinafter, embodiments of the disclosure will be described with reference to the drawings.

Figure 1:
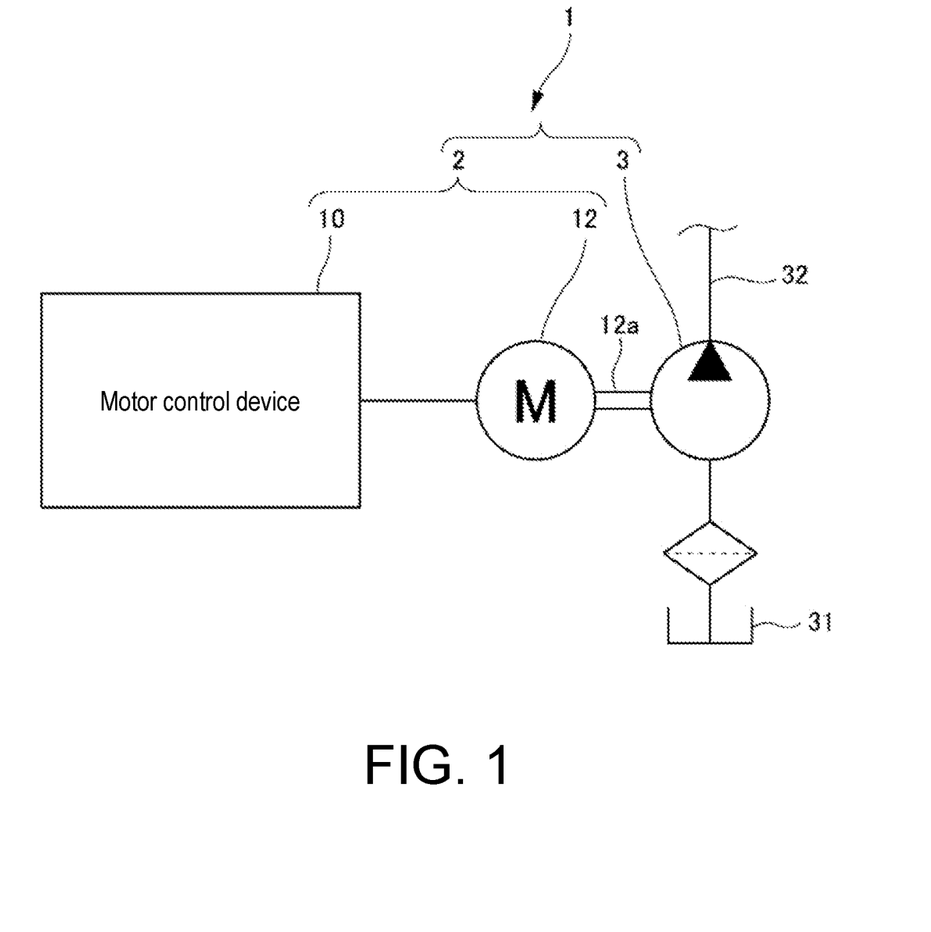
FIG. 1 is a view schematically showing an embodiment of a hydraulic pressure generator.

FIG. 1 is a view schematically showing an embodiment of a hydraulic pressure generator 1.

The hydraulic pressure generator 1 is a device that generates a hydraulic pressure and is, for example, mounted on a vehicle. As shown in FIG. 1, the hydraulic pressure generator 1 includes a motor drive system 2 and a hydraulic pump 3.

The motor drive system 2 includes a motor control device 10 and a motor 12.

The motor control device 10 controls the hydraulic pump 3 by controlling the motor 12. The motor control device 10 is a processing device including, for example, a microcomputer or the like. The hardware configuration of the motor control device 10 is arbitrary and may be similar to an in-vehicle electronic control unit (ECU).

In the motor 12, an output shaft 12a functions as a drive shaft of the hydraulic pump 3. The motor 12 is a three-phase brushless motor, but the number of phases is not limited thereto, and the detailed configuration is arbitrary. The motor 12 may be directly connected to the hydraulic pump 3 or may be connected via another mechanism (not shown) or the like.

The hydraulic pump 3 is an electric pump, and during driving, sucks oil in a tank 31 and discharges to a supply path 32.

In this manner, the hydraulic pressure generator 1 of the present embodiment generates a hydraulic pressure by driving the hydraulic pump 3 via the motor drive system 2. The hydraulic pressure generated by the hydraulic pump 3 (i.e., the oil discharged from the hydraulic pump 3) may be used to drive actuators, cool heat-generating parts of various in-vehicle electronic devices, and lubricate moving parts.

Figure 2:
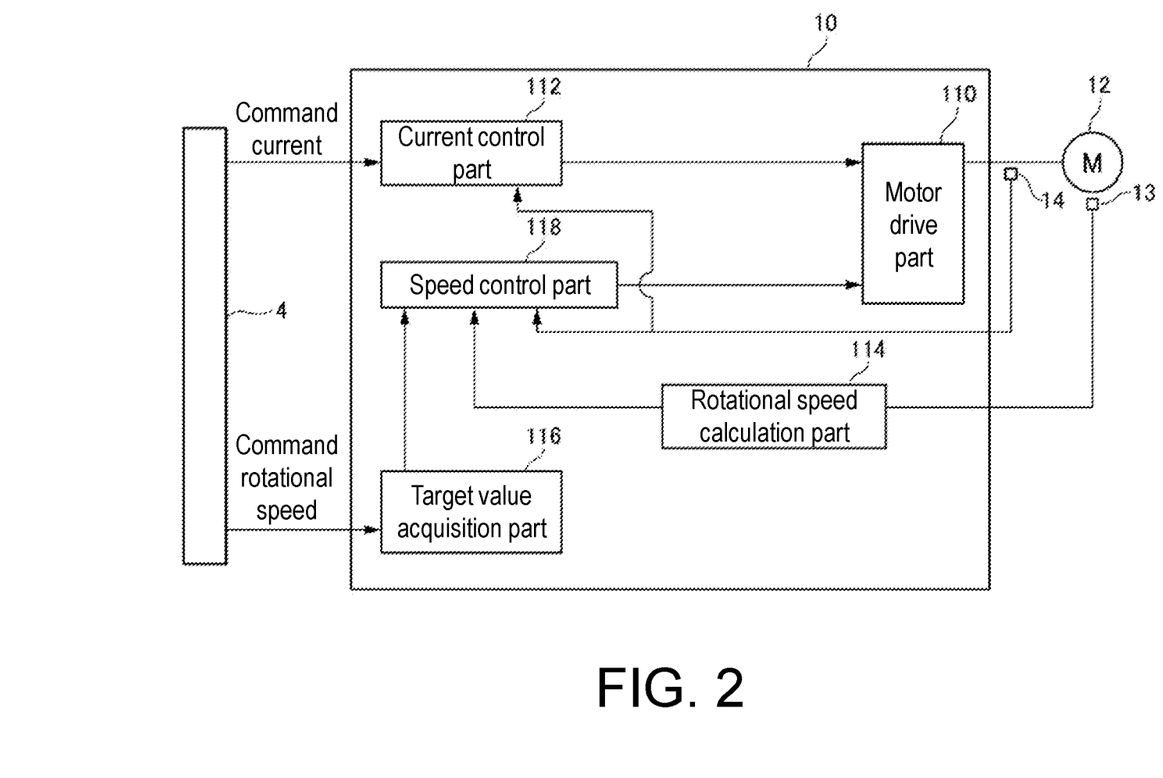
FIG. 2 is a functional block diagram schematically showing an embodiment of a motor control device.

FIG. 2 is a functional block diagram schematically showing an embodiment of the motor control device 10. FIG. 2 shows an upper ECU 4 together with the motor 12, a rotation sensor 13, and a current sensor 14 as associated configurations.

The upper ECU 4 is a control device at a level higher than the motor control device 10 and sends various commands to the motor control device 10. The rotation sensor 13 supplies an electric signal corresponding to a rotational speed of the motor 12 to the motor control device 10 as sensor information. The current sensor 14 detects a phase current flowing through each phase of the motor 12.

As shown in FIG. 2, the motor control device 10 includes a motor drive part 110, a current control part 112, a rotational speed calculation part 114 (an example of an output acquisition part), a target value acquisition part 116, and a speed control part 118.

The motor drive part 110 includes, for example, an integrated circuit (IC) or an inverter, and controls the inverter (not shown) based on a drive duty indicated by the current control part 112 and the speed control part 118 to apply a drive current (e.g., a three-phase drive current) corresponding to the drive duty to the motor 12.

Figure 3:
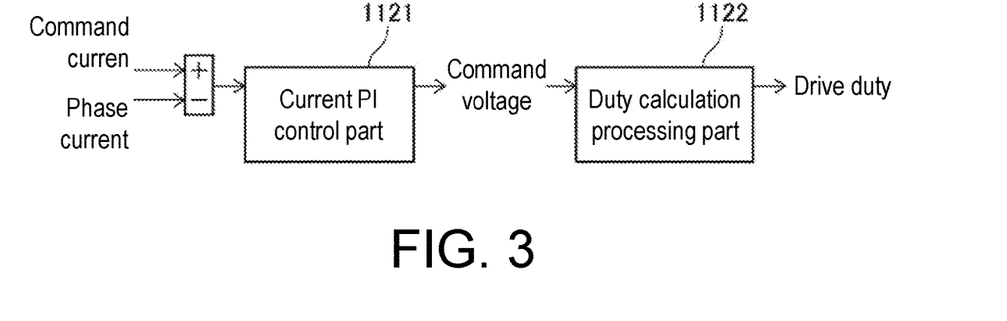
FIG. 3 is a schematic block diagram showing current control realized by a currant control part.

The current control part 112 performs current control for rotating the motor 12 from a stopped state. In other words, the current control part 112 performs current control of starting the motor 12. The current control performed by the current control part 112 may be realized, for example, by the embodiment shown in FIG. 3. FIG. 3 is a schematic block diagram showing the current control realized by the currant control part 112. In the example shown in FIG. 3, in the current control part 112, a command voltage is calculated by a current PI control part 1121 based on a deviation between a command current supplied from the upper ECU 4 and the phase current (detected value) from the current sensor 14. Next, in a duty calculation processing part 1122, based on the command voltage, a drive duty (denoted as "drive duty" in FIG. 3 and other figures) to be supplied to the motor drive part 110 is calculated. In another example, the drive duty may also constantly be a maximum fixed value (e.g., 100%).

The rotational speed calculation part 114 calculates a rotational speed (actual rotational speed) of the motor 12 based on the sensor information from the rotation sensor 13. In another example, the rotational speed calculation part 114 may also calculate (estimate) the actual rotational speed of the motor 12 based on a parameter such as the drive current.

Figure 4:
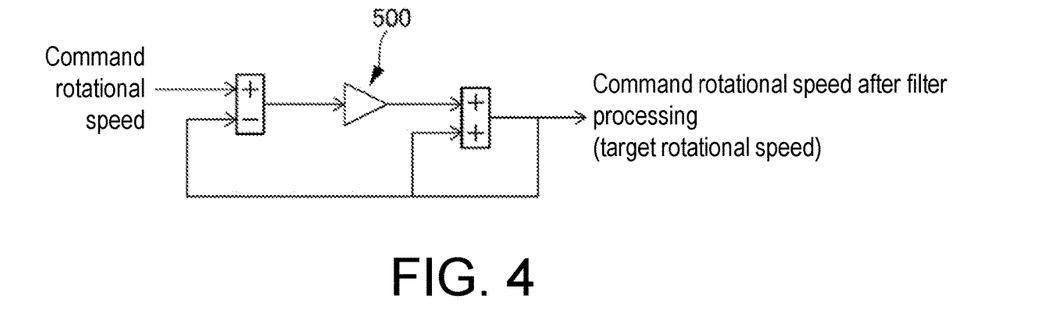
FIG. 4 is a schematic block diagram showing acquisition of a target rotational speed by a target value acquisition part.

The target value acquisition part 116 acquires a target rotational speed, which is a target value associated with the rotational speed of the motor 12. The target value acquisition part 116 acquires (calculates) the target rotational speed based on a command rotational speed from the upper ECU 4. For example, the target value acquisition part 116 may take the command rotational speed from the upper ECU 4 as the target rotational speed. Alternatively, the acquisition of the target rotational speed by the target value acquisition part 116 may be realized, for example, by the embodiment shown in FIG. 4. FIG. 4 is a schematic block diagram showing the acquisition of the target rotational speed by the target value acquisition part 116. In the example shown in FIG. 4, in the target value acquisition part 116, a difference between the command rotational speed from the upper ECU 4 and a command rotational speed after filter processing is calculated, and the difference is multiplied by a filter gain (see arrow 500 in FIG. 4). Next, by adding the difference multiplied by the filter gain and the command rotational speed after filter processing, the command rotational speed after filter processing is acquired as the target rotational speed. In other words, the command rotational speed after filter processing is acquired as the target rotational speed.

Figure 5:
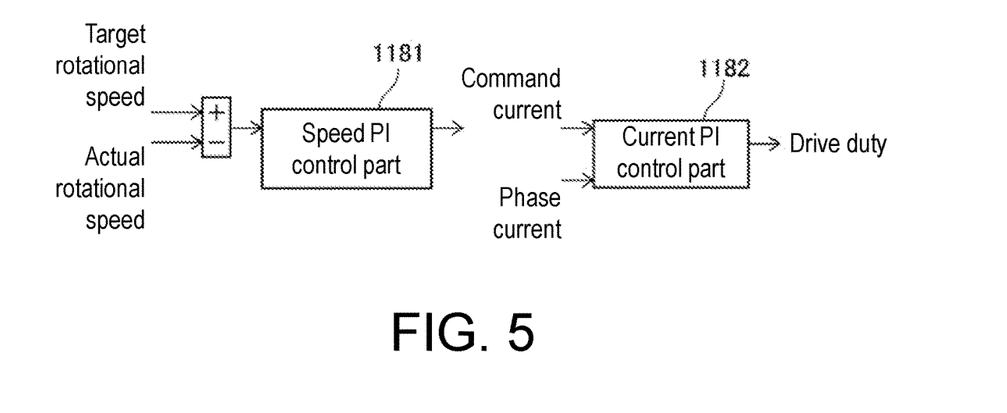
FIG. 5 is a schematic block diagram showing speed control realized by a speed control part.

The speed control part 118 performs speed control so that the actual rotational speed of the motor 12 calculated by the rotational speed calculation part 114 becomes the target rotational speed acquired by the target value acquisition part 116. The speed control performed by the speed control part 118 may be realized, for example, by the embodiment shown in FIG. 5. FIG. 5 is a schematic block diagram showing the speed control realized by the speed control part 118. In the example shown in FIG. 5, in the speed control part 118, a command current is calculated by a speed PI control part 1181 based on a deviation between the target rotational speed acquired by the target value acquisition part 116 and the actual rotational speed calculated by the rotational speed calculation part 114. Next, a command voltage is calculated by a current PI control part 1182 based on the deviation between the command current and the phase current (detected value) from the current sensor 14. Then, by executing duty calculation processing based on the command voltage, the drive duty to be supplied to the motor drive part 110 is calculated.

At the time of starting the motor 12, the speed control performed by the speed control part 118 is executed following the current control performed by the current control part 112 described above. In the present embodiment, the control state of the motor control device 10 selectively includes a speed control state by the speed control part 118 and a current control state by the current control part 112, and the transition from the current control state to the speed control state at the time of starting the motor 12 is realized when a predetermined transition condition is satisfied. The predetermined transition condition is satisfied, for example, when the actual rotational speed calculated by the rotational speed calculation part 114 exceeds a threshold value. Alternatively, the predetermined transition condition may also be satisfied when the current control state by the currant control part 112 continues for a predetermined time or longer. Alternatively, the predetermined transition condition may also be satisfied even when the rotation amount of the motor 12 exceeds a threshold value (e.g., one rotation).

Next, an exemplary configuration of the speed PI control part 1181 will be described with reference to FIG. 6 and subsequent figures. The exemplary configuration of the speed PI control part 1181 described below may also be applied to the current PI control part 1121 and the current PI control part 1182.

Figure 6:
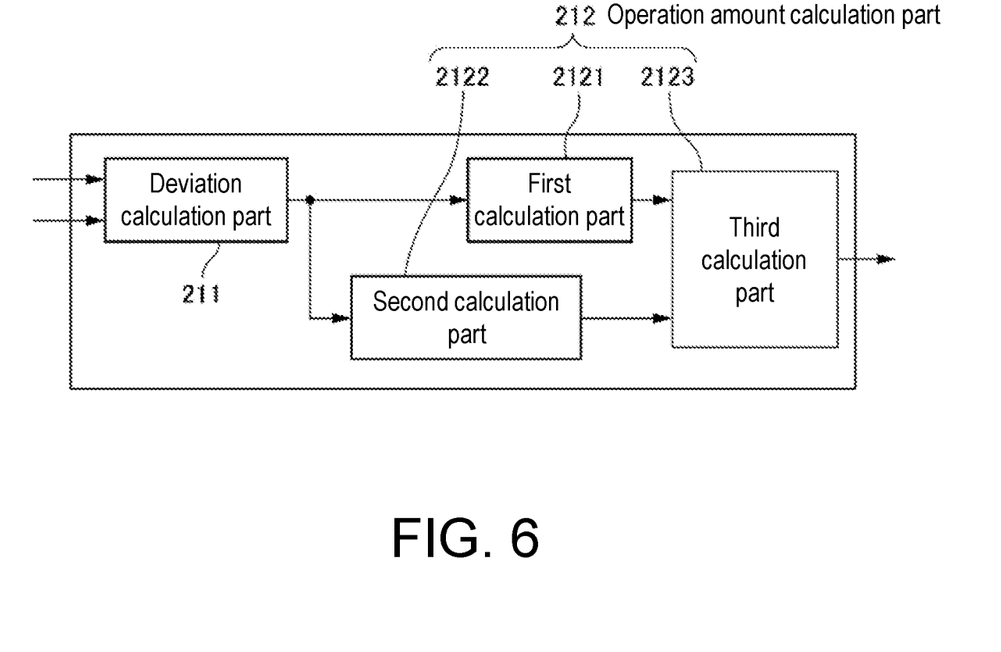
FIG. 6 is a schematic block diagram showing functions of a speed PI control part.

FIG. 6 is a schematic block diagram showing functions of the speed PI control part 1181.

Based on the deviation between the target rotational speed acquired by the target value acquisition part 116 and the actual rotational speed calculated by the rotational speed calculation part 114, the speed PI control part 1181 calculates an operation amount, which is the command current, in a range that does not exceed an operation amount upper limit value. The operation amount upper limit value corresponds to the upper limit value of the command current and may be set as appropriate.

In the present embodiment, the speed PI control part 1181 includes a deviation calculation part 211 and an operation amount calculation part 212, as shown in FIG. 6.

The deviation calculation part 211 calculates a deviation $\Delta$rpm by subtracting the actual rotational speed (an example of an output) from the target rotational speed (an example of a target value) acquired by the target value acquisition part 116.

The operation amount calculation part 212 calculates the operation amount, which is the command current, based on the deviation $\Delta$rpm calculated by the deviation calculation part 211.

The operation amount calculation part 212 includes a first calculation part 2121, a second calculation part 2122, and a third calculation part 2123.

Based on the deviation $\Delta$rpm calculated by the deviation calculation part 211, the first calculation part 2121 calculates a first value corresponding to the deviation $\Delta$rpm. In the present embodiment, the first calculation part 2121 calculates the first value (=$\Delta$rpm×Kp) by multiplying the deviation $\Delta$rpm by a proportional gain Kp. Such a first value is also referred to as a P term value in relation to PI control.

Based on the deviation $\Delta$rpm calculated by the deviation calculation part 211 and based on an integrated value $\tau\Delta$rpm obtained by integrating the deviation $\Delta$rpm over time, the second calculation part 2122 calculates a second value in a range that does not exceed a predetermined upper limit value $I2_{limit}$. The initial value of the integrated value of the deviation $\Delta$rpm may be 0. In the present embodiment, the second value is the smaller value between a value (=$\Sigma\Delta$rpm×Ki) obtained by multiplying the integrated value by an integrated gain Ki and the predetermined upper limit value $I2_{limit}$. Such a second value is also referred to as an I term value in relation to PI control.

The predetermined upper limit value $I2_{limit}$ is larger than a value obtained by subtracting the first value calculated by the first calculation part 2121 from the operation amount upper limit value $I1_{limit}$, i.e., $I2_{limit} > I1_{limit} - \Delta\text{rpm} \times \text{Kp}$. In the present embodiment, the predetermined upper limit value $I2_{limit}$ is equal to the operation amount upper limit value $I1_{limit}$. Further details of the predetermined upper limit value $I2_{limit}$ will be described later.

Based on the first value calculated by the first calculation part 2121 and the second value calculated by the second calculation part 2122, the third calculation part 2123 calculates the operation amount (command current) in a range that does not exceed the operation amount upper limit value $I1_{limit}$. For example, the third calculation part 2123 calculates an operation amount corresponding to a sum of the first value and the second value, and outputs the smaller one between the calculated operation amount and the operation amount upper limit value $I1_{limit}$ as the final operation amount.

Figure 7:
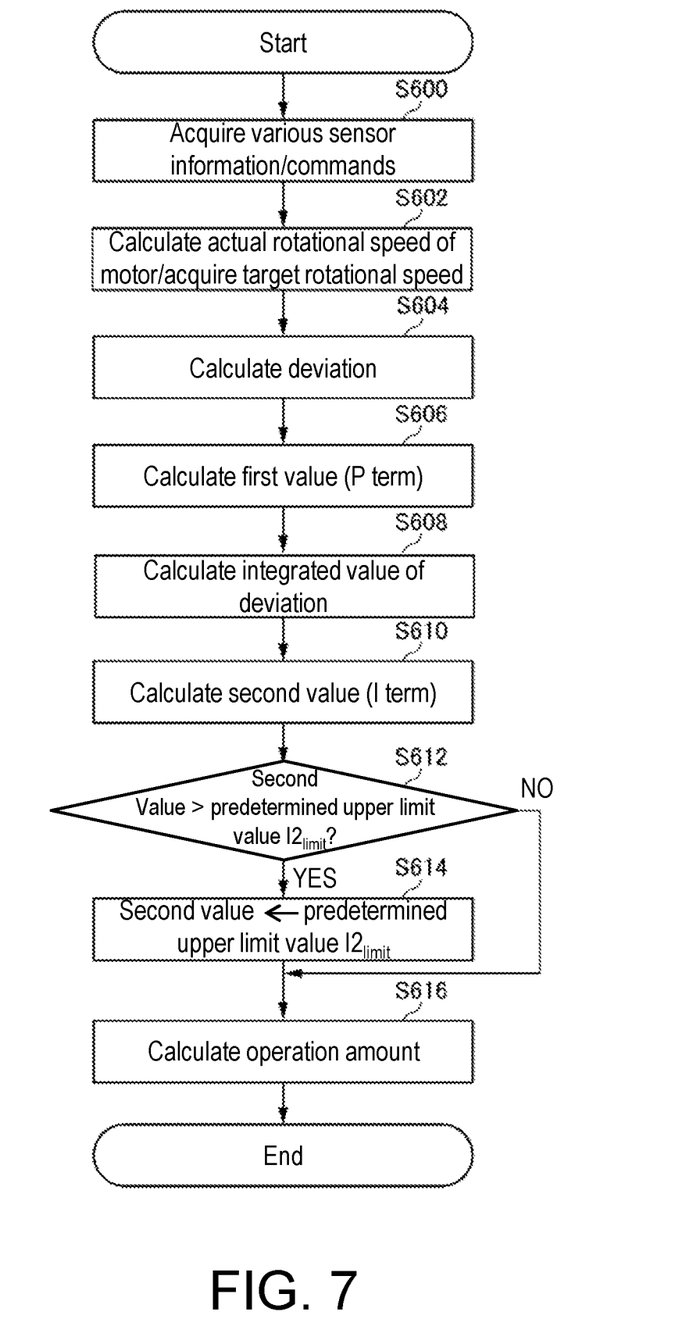
FIG. 7 is an example of a processing flow executed by the speed PI control part.

FIG. 7 is an example of a processing flow executed by the speed PI control part 1181. The processing flow shown in FIG. 7 is periodically and repeatedly executed in the speed control state performed by the speed control part 118. In the following, regarding the values of various parameters, the value of the current cycle is represented by "(k)", and the value of the previous cycle is represented by "(k−1)".

The speed PI control part 1181 acquires various sensor information (sensor information from the rotation sensor 13 and the current sensor 14) of the current cycle, and also acquires various commands from the upper ECU 4 (step S600).

Next, the speed PI control part 1181 calculates an actual rotational speed of the motor control device 10 based on the sensor information and acquires a target rotational speed (step S602).

Then, the speed PI control part 1181 calculates a deviation $\Delta$rpm (k) of the current cycle based on the actual rotational speed and the target rotational speed of the current cycle calculated/acquired in step S602 (step S604).

Next, the speed PI control part 1181 calculates a first value (=$\Delta$rpm×Kp) of the current cycle based on the deviation $\Delta$rpm (k) calculated in step S604 (step S606).

Then, the speed PI control part 1181 calculates an integrated value $\Sigma\Delta$rpm (k) of the current cycle based on the deviation $\Delta$rpm (k) calculated in step S604 and an integrated value $\Sigma\Delta$rpm (k−1) of the previous cycle. Specifically, $\Sigma\Delta$rpm (k)=$\Sigma\Delta$rpm (k−1)+$\Delta$rpm (k) (step S608). In the initial cycle, the integrated value $\Sigma\Delta$rpm (k−1) of the previous cycle is 0.

Next, the speed PI control part 1181 calculates a second value (=$\Sigma\Delta$rpm (k)×Ki) of the current cycle by multiplying the integrated value $\Sigma\Delta$rpm (k) of the current cycle by an integrated gain Ki (step S610).

Then, the speed PI control part 1181 determines whether the second value (=$\Sigma\Delta$rpm (k)×Ki) of the current cycle exceeds a predetermined upper limit value $I2_{limit}$ (step S612). When the second value (=$\Sigma\Delta$rpm (k)×Ki) of the current cycle exceeds the predetermined upper limit value $I2_{limit}$ ("YES" in step S612), the second value of the current cycle is set (corrected) to the predetermined upper limit value $I2_{limit}$ (step S614), and the process proceeds to step S616. In contrast, when the second value (=$\Delta$rpm (k)×Ki) of the current cycle does not exceed the predetermined upper limit value $I2_{limit}$ ("NO" in step S612), the process proceeds to step S616 without going through step S614.

Next, the speed PI control part 1181 calculates an operation amount based on the first value of the current cycle and the second value of the current cycle (step S616). The calculation method of the operation amount is as described above in relation to the third calculation part 2123.

In this manner, according to the process shown in FIG. 7, PI control can be realized while limiting the second value so as not to exceed the predetermined upper limit value $I2_{limit}$. In a modified example, PID control may be realized instead of PI control.

Figure 8:
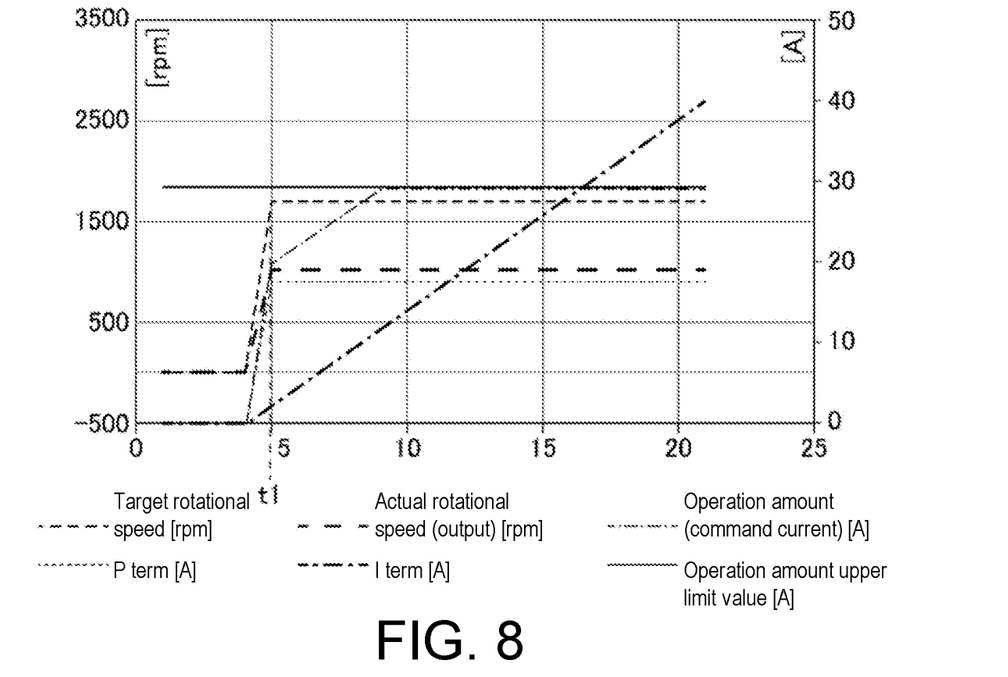
FIG. 8 is a diagram showing various time-series waveforms based on speed control according to a first comparative example.

FIG. 8 is a diagram showing various time-series waveforms based on speed control according to a first comparative example, in which the horizontal axis represents time, and the vertical axis represents rotational speed and current. The various time-series waveforms include the target rotational speed, the actual rotational speed (output), the operation amount (command current), the P term, the I term, and the operation amount upper limit value $I1_{limit}$. In the example shown in FIG. 8, the command rotational speed from the upper ECU 4 is taken as the target rotational speed.

The speed control according to the first comparative example is similar to the present embodiment in that it is speed control based on PI control, but is different from the present embodiment in that the predetermined upper limit value $I2_{limit}$ is not set. In such a first comparative example, as shown in FIG. 8, for example, due to the relatively large load (the discharge pressure of the hydraulic pump 3 in the present embodiment) of the motor 12, if the state in which the deviation between the target rotational speed and the actual rotational speed (output) is relatively large continues for a relatively long period of time (e.g., a period from time point t1), the I term value (integrated value) may become excessively large with the operation amount reaching the operation amount upper limit value $I1_{limit}$. In such a case, afterwards, when the deviation sharply decreases or reverses, since the I term value up to that point is excessively large, there is a problem that the operation amount continues to be stuck to the operation amount upper limit value $I1_{limit}$, and responsiveness deteriorates.

Figure 9:
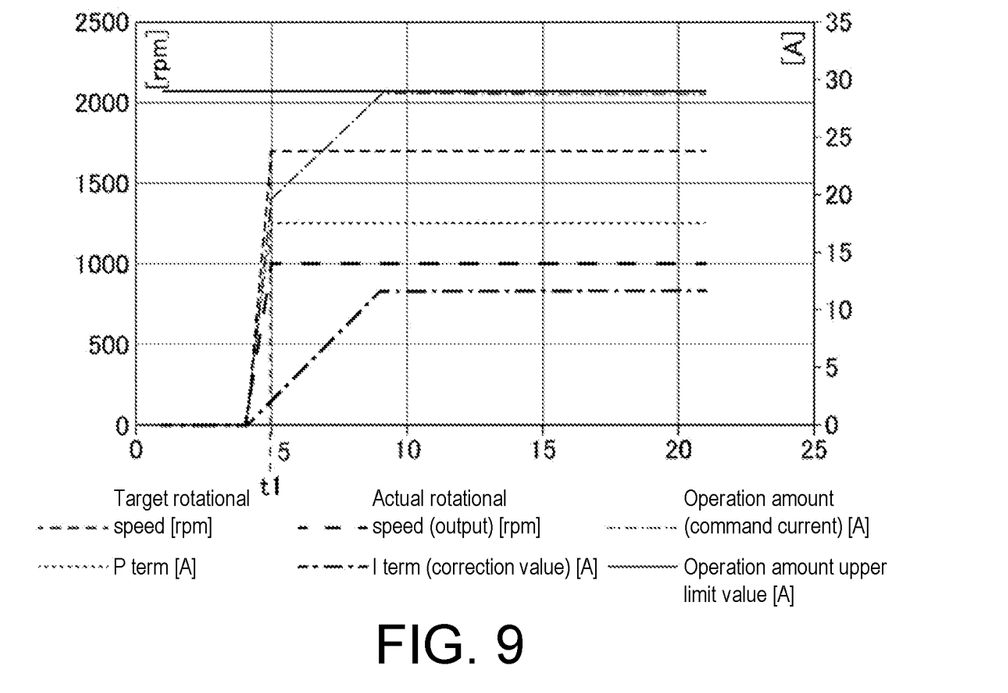
FIG. 9 is a diagram showing various time-series waveforms based on speed control according to a second comparative example.
Figure 10:
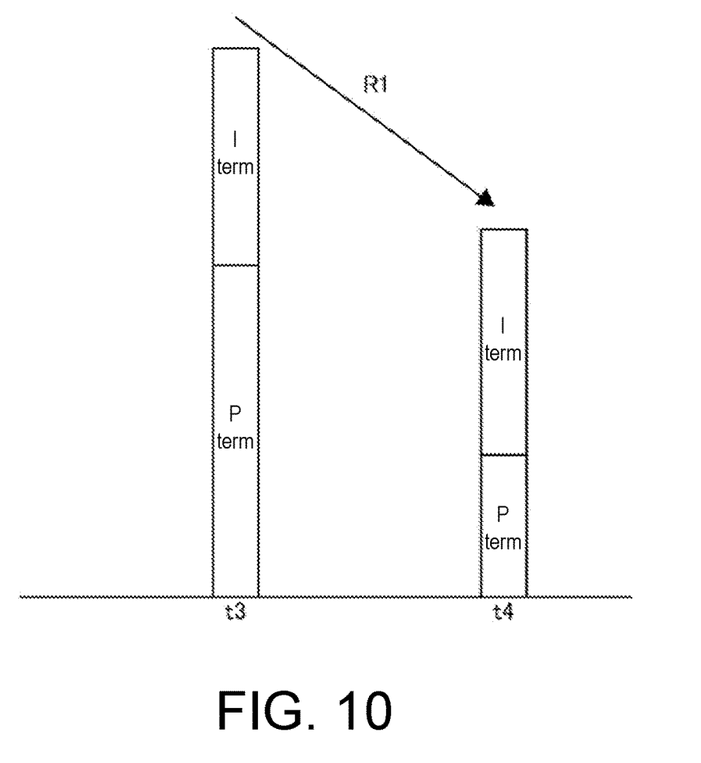
FIG. 10 is a diagram showing an issue in speed control according to the second comparative example.

FIG. 9 and FIG. 10 are diagrams showing various time-series waveforms based on speed control according to a second comparative example, in which the horizontal axis represents time and the vertical axis represents rotational speed and current. The various time-series waveforms include the target rotational speed, the actual rotational speed (output), the operation amount (command current), the P term, the I term, and the operation amount upper limit value $I1_{limit}$. In the examples shown in FIG. 9 and FIG. 10, the command rotational speed from the upper ECU 4 is taken as the target rotational speed.

The speed control according to the second comparative example is similar to the present embodiment in that it is speed control based on PI control, but is different from the present embodiment in that the upper limit value corresponding to the predetermined upper limit value $I2_{limit}$ is a value obtained by subtracting the P term value from the operation amount upper limit value $I1_{limit}$. In such a second comparative example, unlike the first comparative example described above, even if the state in which the deviation between the target rotational speed and the actual rotational speed (output) is relatively large continues for a relatively long period of time, the I term value is prevented from becoming infinitely large. However, in such a second comparative example, on the other hand, the state in which the deviation between the target rotational speed and the actual rotational speed (output) is relatively large continues for a relatively long period of time, and afterwards, when the deviation sharply decreases or reverses, the operation amount responds immediately and tends to decrease within a short time.

Specifically, in the example shown in FIG. 10, the state in which the deviation between the target rotational speed and the actual rotational speed (output) is relatively large continues until time point t3, and the I term value from time point t2 before time point t3 is limited by the upper limit value. Then, afterwards, at time point t4, the deviation sharply decreases due to the sharp decrease in the target rotational speed. In this case, as shown schematically by a bar graph at the lower side of the graph of FIG. 10, the P term value sharply decreases from time point t3 to time point t4 (see arrow R1), and as a result, the operation amount sharply decreases from time point t3 to time point t4. Such responsiveness of the operation amount may be a factor that causes the rotational speed of the motor 12 to decrease sharply (and accordingly a factor that hinders the realization of the desired rotational state of the motor 12 due to the load).

In particular, since the motor 12 drives the hydraulic pump 3 as described above, the state in which the deviation between the target rotational speed and the actual rotational speed (output) is relatively large is likely to be realized in a state in which the hydraulic pressure is relatively high. If the actual rotational speed of the motor 12 sharply decreases in the state in which the hydraulic pressure is relatively high, there is risk that the desired rotational state of the motor 12 may not be realized due to the load caused by the relatively high hydraulic pressure. As a result, although not occurring in FIG. 10, a situation in which the motor 12 stops (a situation in which the actual rotational speed becomes 0) may occur.

In contrast, according to the present embodiment, as will be described below with reference to FIG. 11 to FIG. 13, problems that occur in the first comparative example and the second comparative example described above can be reduced.

Figure 11:
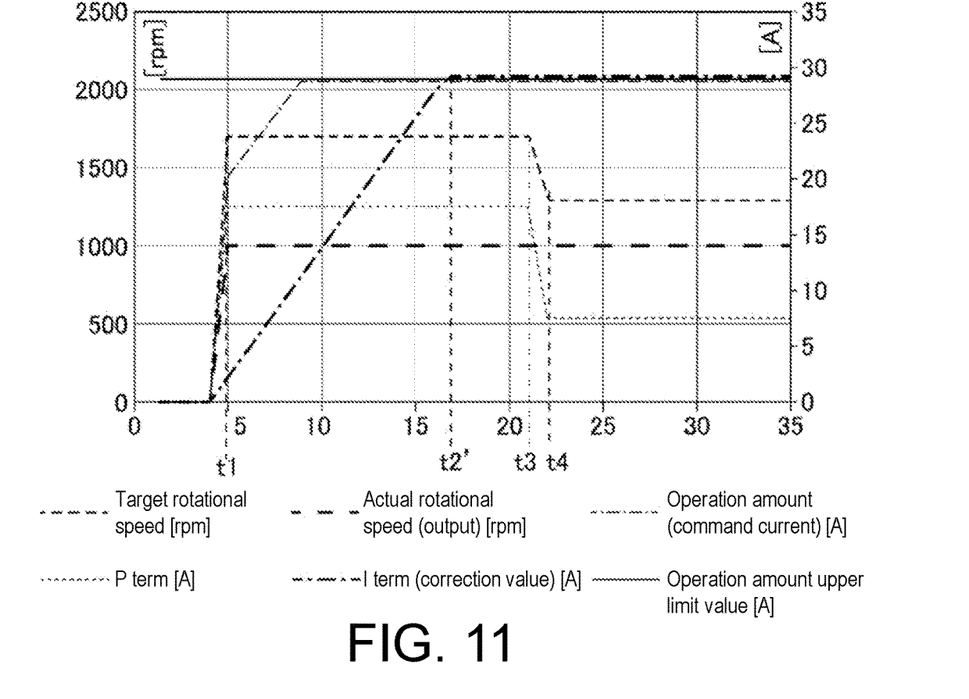
FIG. 11 is a diagram showing various time-series waveforms based on speed control according to the present embodiment.
Figure 12:
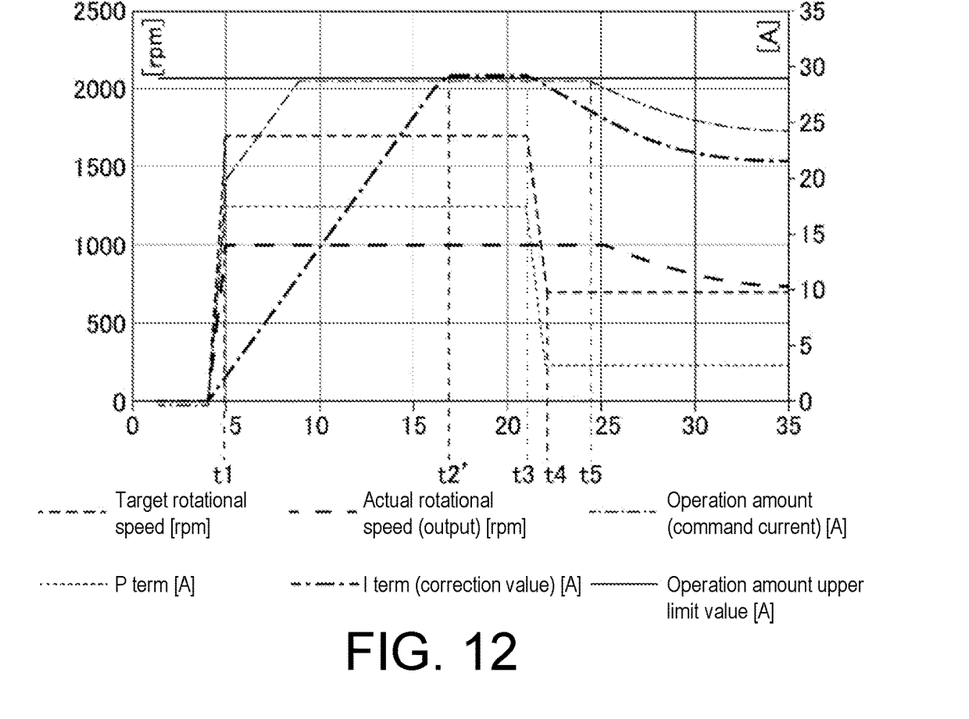
FIG. 12 is a diagram showing various time-series waveforms based on speed control according to the present embodiment.
Figure 13:
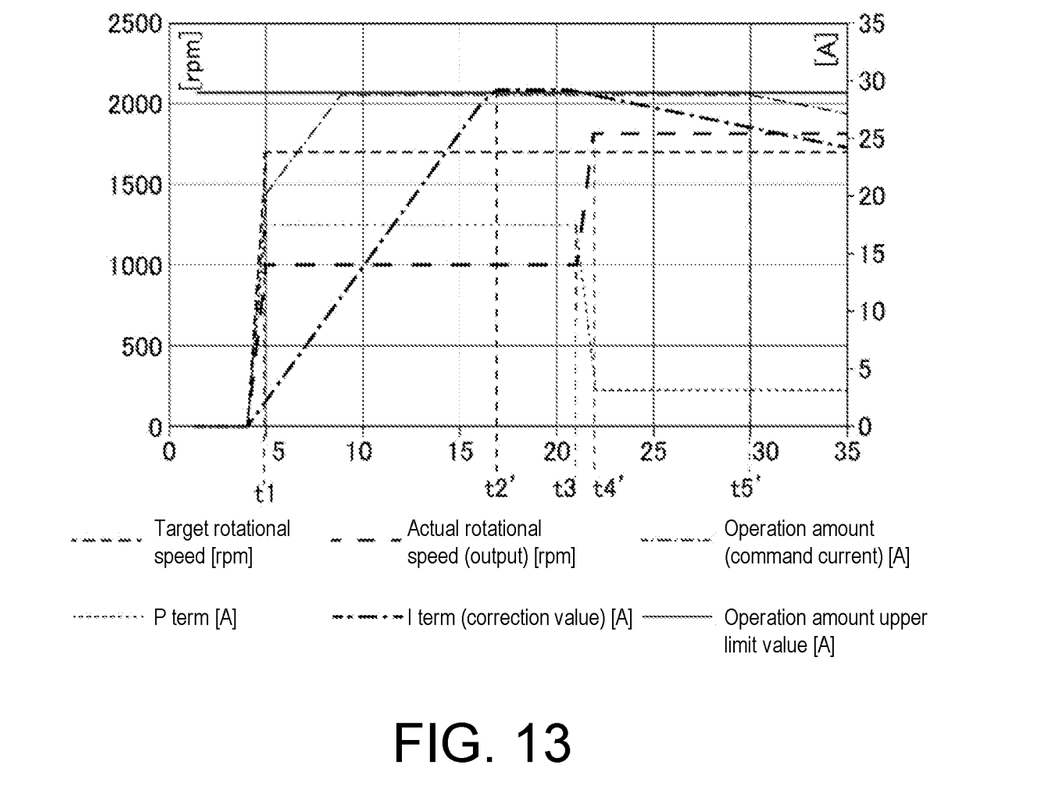
FIG. 13 is a diagram showing various time-series waveforms based on speed control according to the present embodiment.

FIG. 11 to FIG. 13 are diagrams showing various time-series waveforms based on speed control according to the present embodiment, in which the horizontal axis represents time and the vertical axis represents rotational speed and current. The various time-series waveforms include the target rotational speed, the actual rotational speed (output), the operation amount (command current), the first value (P term), the second value (I term), and the operation amount upper limit value $I1_{limit}$. In the examples shown in FIG. 11 to FIG. 13, the command rotational speed from the upper ECU 4 is taken as the target rotational speed.

In the examples shown in FIG. 11 to FIG. 13, similar to the case of the first comparative example and the second comparative example described above, the state in which the deviation between the target rotational speed and the actual rotational speed (output) is relatively large continues until time point t3, and the I term value from time point t2' before time point t3 is limited by the predetermined upper limit value $I2_{limit}$.

In the example shown in FIG. 11, after time point t2', at time point t4, the deviation sharply decreases due to the sharp decrease in the target rotational speed. In this case, similar to the case of the second comparative example described above, the P term value sharply decreases from time point t3 to time point t4. However, in the present embodiment, as shown in FIG. 11, from time point t3 to time point t4, since the second value (I term value) remains stuck to the predetermined upper limit value $I2_{limit}$, different from the case of the second comparative example described above, the operation amount remains at the operation amount upper limit value $I1_{limit}$ (i.e., it does not sharply decrease from time point t3 to time point t4).

Therefore, according to the present embodiment, by setting the predetermined upper limit value $I2_{limit}$ with respect to the second value (I term value) to the operation amount upper limit value $I1_{limit}$ which is significantly larger than the upper limit value in the case of the second comparative example described above, different from the second comparative example described above, the operation amount does not sharply decrease from time point t3 to time point t4. In other words, it is possible to eliminate sensitive responsiveness that causes the rotational speed of the motor 12 to decrease sharply, and thereby reduce the possibility that the desired rotational state of the motor 12 is not realized due to the load.

In the example shown in FIG. 12, after time point t2', at time point t4, with the target rotational speed decreasing more sharply than the example shown in FIG. 11, the deviation sharply decreases and reverses. In this case, from the time point t3 to time point t4, the P term value decreases more sharply than the example shown in FIG. 11 described above. However, in the present embodiment, as shown in FIG. 12, at time point t3, since the second value (I term value) is the predetermined upper limit value $I2_{limit}$, which is a relatively large value, although the second value (I term value) is decreased by the reversal of the deviation, the operation amount remains at the operation amount upper limit value $I1_{limit}$ (i.e., it does not sharply decrease from time point t3 to time point t4). Further, from time point t5 at which the state in which the deviation is reversed continues, the operation amount decreases to a value smaller than the operation amount upper limit value $I1_{limit}$. Accordingly, the operation amount is decreased with an appropriate delay for a sharp and relatively large decrease in the target rotational speed from time point t3 to time point t4.

Therefore, according to the present embodiment, by setting the predetermined upper limit value $I2_{limit}$ with respect to the second value (I term value) to the operation amount upper limit value $I1_{limit}$ which is significantly larger than the upper limit value in the case of the second comparative example described above, and not setting to an excessively large value, while avoiding sensitive responsiveness as in the case of the second comparative example described above, it is possible to avoid an excessive response delay as in the case of the first comparative example described above. In other words, according to the present embodiment, the operation amount can be changed with the optimal responsiveness with respect to the relationship (time series) between the target rotational speed and the actual rotational speed as shown in FIG. 12. Accordingly, it is possible to solve the problems that may occur in the first comparative example and the second comparative example described above.

In the example shown in FIG. 13, after time point t2', at time point t4', due to the large and sharp increase in the actual rotational speed, the deviation sharply decreases and reverses. In this case, different from the example shown in FIG. 12, the deviation sharply decreases and reverses due to the change in the actual rotational speed. Similarly, in this case, basically the same as the example shown in FIG. 12, although the second value (I term value) is decreased from time point t4' due to the reversal of the deviation, the operation amount remains at the operation amount upper limit value $I1_{limit}$ (i.e., it does not sharply decrease from time point t3 to time point t4'). Further, from time point t5' at which the state in which the deviation is reversed continues, the operation amount decreases to a value smaller than the operation amount upper limit value $I1_{limit}$. Accordingly, the operation amount is decreased with an appropriate delay for the sharp and relatively large increase in the actual rotational speed from time point t3 to time point t4'.

In this manner, according to the present embodiment, even if the state in which the deviation between the target rotational speed and the actual rotational speed is relatively large continues for a relatively long period of time and then the deviation sharply decreases or reverses, the operation amount for the motor 12 can be changed with appropriate responsiveness. As a result, even if the state in which the deviation between the target rotational speed and the actual rotational speed is relatively large continues for a relatively long period of time and then the deviation sharply decreases or reverses, it is possible to avoid a sharp decrease in the rotational speed of the motor 12 due to relatively sensitive responsiveness and avoid non-response in the rotational speed of the motor 12 over a relatively long period of time (or a sharp decrease due to an excessive response delay).

Although the embodiments of the disclosure have been described in detail with reference to the drawings, the specific configuration is not limited to the embodiments and includes a design and the like within a range that does not depart from the gist of the disclosure.

For example, in the above-described embodiment, although the predetermined upper limit value $I2_{limit}$ is set to the operation amount upper limit value $I1_{limit}$, it may also be set to another value as long as it is larger than a value obtained by subtracting the P term value from the operation amount upper limit value $I1_{limit}$. For example, the predetermined upper limit value $I2_{limit}$ may be set to a constant value that is substantially the same (e.g., within 10%) with respect to the operation amount upper limit value $I1_{limit}$. Further, the predetermined upper limit value $I2_{limit}$ may also be a value obtained by subtracting the value of a predetermined parameter from the operation amount upper limit value $I1_{limit}$. In this case, the value of the predetermined parameter may be a value obtained by multiplying the P term value by a predetermined coefficient, and the predetermined coefficient is a positive number significantly smaller than 1. For example, the predetermined coefficient may be a value of about 0.1.

The following appendices will be further disclosed with respect to the above embodiments of the disclosure.

Appendix 1

A motor control device (10) including:
a target value acquisition part (116) that acquires a target value of a control parameter associated with a motor;
an operation amount calculation part (212) that calculates an operation amount for the motor;
an output acquisition part (rotational speed calculation part 114) that acquires an output of the control parameter outputted from the motor when the motor is driven based on the operation amount calculated by the operation amount calculation part; and
a deviation calculation part (211) that calculates a deviation between the target value acquired by the target value acquisition part and the output acquired by the output acquisition part,
wherein the operation amount calculation part includes:
    a first calculation part (2121) that calculates a first value corresponding to the deviation calculated by the deviation calculation part;
    a second calculation part (2122) that calculates a second value in a range that does not exceed a predetermined upper limit value based on an integrated value obtained by integrating the deviation over time; and
    a third calculation part (2123) that calculates the operation amount in a range that does not exceed an operation amount upper limit value based on the first value calculated by the first calculation part and the second value calculated by the second calculation part,
wherein the predetermined upper limit value is larger than a value obtained by subtracting the first value calculated by the first calculation part from the operation amount upper limit value.

According to the configuration described in Appendix 1, it is possible to provide a motor control device that can prevent the rotational speed of the motor from sharply decreasing even if the state in which the deviation between the target value and the output is relatively large continues for a relatively long period of time and then the deviation sharply decreases or reverses.

Appendix 2

The motor control device according to Appendix 1, wherein the predetermined upper limit value is substantially the same as the operation amount upper limit value.

According to the configuration described in Appendix 2, since the predetermined upper limit value is substantially the same as the operation amount upper limit value, even if the state in which the deviation between the target value and the output is relatively large continues for a relatively long period of time and then the deviation sharply decreases or reverses, it is less likely that the operation amount will immediately fall below the operation amount upper limit value, and it is more likely that the operation amount will remain at the operation amount upper limit value. Therefore, even if the state in which the deviation between the target value and the output is relatively large continues for a relatively long period of time and then the deviation sharply decreases or reverses, it is possible to prevent the rotational speed of the motor from sharply decreasing.

Appendix 3

The motor control device according to Appendix 1 or 2, wherein with the first value calculated by the first calculation part being a P term and the second value calculated by the second calculation part being an I term, the third calculation part calculates the operation amount so that PI control is realized.

According to the configuration described in Appendix 3, the motor can be driven with appropriate responsiveness based on PI control.

Appendix 4

The motor control device according to any one of Appendices 1 to 3, wherein the motor is used for a hydraulic pump.

The state in which the deviation between the target value and the output is relatively large corresponds to the state in which the load of the motor is relatively large, and in the case of a motor for a hydraulic pump, when the rotational speed of the motor decreases sharply in a state in which the load of the motor is relatively large, the motor may stop due to the relatively large load. In contrast, according to the configuration described in Appendix 4, even in the case of use for a hydraulic pump, it is possible to reduce the possibility that the motor will be stopped due to the relatively large load.

Appendix 5

A motor drive system including:
a motor; and
a motor control device that controls the motor,
wherein the motor control device includes:
    a target value acquisition part that acquires a target value of a control parameter associated with the motor;
    an operation amount calculation part that calculates an operation amount for the motor;
    an output acquisition part that acquires an output of the control parameter outputted from the motor when the motor is driven based on the operation amount calculated by the operation amount calculation part; and
    a deviation calculation part that calculates a deviation between the target value acquired by the target value acquisition part and the output acquired by the output acquisition part,
wherein the operation amount calculation part includes:
    a first calculation part that calculates a first value corresponding to the deviation calculated by the deviation calculation part;
    a second calculation part that calculates a second value in a range that does not exceed a predetermined upper limit value based on an integrated value obtained by integrating the deviation over time; and
    a third calculation part that calculates the operation amount in a range that does not exceed an operation amount upper limit value based on the first value calculated by the first calculation part and the second value calculated by the second calculation part,
wherein the predetermined upper limit value is larger than a value obtained by subtracting the first value calculated by the first calculation part from the operation amount upper limit value.

According to the configuration described in Appendix 5, it is possible to provide a motor drive system that can prevent the rotational speed of the motor from sharply decreasing even if the state in which the deviation between the target value and the output is relatively large continues for a relatively long period of time and then the deviation sharply decreases or reverses.

Appendix 6

A hydraulic pressure generator including:
a hydraulic pump;
a motor that drives the hydraulic pump; and
a motor control device that controls the motor,
wherein the motor control device includes:
    a target value acquisition part that acquires a target value of a control parameter associated with the motor;
    an operation amount calculation part that calculates an operation amount for the motor;
    an output acquisition part that acquires an output of the control parameter outputted from the motor when the motor is driven based on the operation amount calculated by the operation amount calculation part; and
    a deviation calculation part that calculates a deviation between the target value acquired by the target value acquisition part and the output acquired by the output acquisition part,
wherein the operation amount calculation part includes:
    a first calculation part that calculates a first value corresponding to the deviation calculated by the deviation calculation part;
    a second calculation part that calculates a second value in a range that does not exceed a predetermined upper limit value based on an integrated value obtained by integrating the deviation over time; and
    a third calculation part that calculates the operation amount in a range that does not exceed an operation amount upper limit value based on the first value calculated by the first calculation part and the second value calculated by the second calculation part, wherein the predetermined upper limit value is larger than a value obtained by subtracting the first value calculated by the first calculation part from the operation amount upper limit value.

According to the configuration described in Appendix 6, it is possible to provide a hydraulic pressure generator that can prevent the rotational speed of the motor from sharply decreasing even if the state in which the deviation between the target value and the output is relatively large continues for a relatively long period of time and then the deviation sharply decreases or reverses.

Appendix 7

A motor control method including:
a target value acquisition step of acquiring a target value of a control parameter associated with a motor;
an operation amount calculation step of calculating an operation amount for the motor;
an output acquisition step of acquiring an output of the control parameter outputted from the motor when the motor is driven based on the operation amount calculated by the operation amount calculation step; and
a deviation calculation step of calculating a deviation between the target value acquired by the target value acquisition step and the output acquired by the output acquisition step,
wherein the operation amount calculation step includes:
 a first calculation step of calculating a first value corresponding to the deviation calculated by the deviation calculation step;
 a second calculation step of calculating a second value in a range that does not exceed a predetermined upper limit value based on an integrated value obtained by integrating the deviation over time; and
 a third calculation step of calculating the operation amount in a range that does not exceed an operation amount upper limit value based on the first value calculated by the first calculation step and the second value calculated by the second calculation step,
wherein the predetermined upper limit value is larger than a value obtained by subtracting the first value calculated by the first calculation step from the operation amount upper limit value.

According to the configuration described in Appendix 7, it is possible to provide a motor control method that can prevent the rotational speed of the motor from sharply decreasing even if the state in which the deviation between the target value and the output is relatively large continues for a relatively long period of time and then the deviation sharply decreases or reverses.

Appendix 8

A motor control program causing a computer to execute:
a target value acquisition process of acquiring a target value of a control parameter associated with a motor;
an operation amount calculation process of calculating an operation amount for the motor;
an output acquisition process of acquiring an output of the control parameter outputted from the motor when the motor is driven based on the operation amount calculated by the operation amount calculation process; and
a deviation calculation process of calculating a deviation between the target value acquired by the target value acquisition process and the output acquired by the output acquisition process,
wherein the operation amount calculation process includes:
 a first calculation process of calculating a first value corresponding to the deviation calculated by the deviation calculation process;
 a second calculation process of calculating a second value in a range that does not exceed a predetermined upper limit value based on an integrated value obtained by integrating the deviation over time; and
 a third calculation process of calculating the operation amount in a range that does not exceed an operation amount upper limit value based on the first value calculated by the first calculation process and the second value calculated by the second calculation process,
wherein the predetermined upper limit value is larger than a value obtained by subtracting the first value calculated by the first calculation process from the operation amount upper limit value.

According to the configuration described in Appendix 8, it is possible to provide a motor control program that can prevent the rotational speed of the motor from sharply decreasing even if the state in which the deviation between the target value and the output is relatively large continues for a relatively long period of time and then the deviation sharply decreases or reverses.

What is claimed is:
1. A motor control device comprising:
a hardware processor configured to:
acquire a target value of a control parameter associated with a motor;
calculate an operation amount for the motor;
acquire an output of the control parameter outputted from the motor when the motor is driven based on the operation amount which has been calculated;
calculate a deviation between the target value which has been acquired and the output which has been acquired, wherein the hardware processor is configured to calculate the operation amount for the motor comprises:
 calculate a first value by multiplying the deviation which has been calculated with a proportional gain;
 calculate a second value in a range that does not exceed a predetermined upper limit value based on an integrated value obtained by integrating the deviation over time; and
 calculate the operation amount in a range that does not exceed an operation amount upper limit value based on the first value which has been calculated and the second value which has been calculated, wherein the predetermined upper limit value is larger than a value obtained by subtracting the first value which has been calculated from the operation amount upper limit value; and
drive the motor according to the operation amount, wherein the predetermined upper limit value is set within an upper bound and a lower bound respective to the operation amount upper limit value.

2. The motor control device according to claim 1, wherein the predetermined upper limit value is substantially the same as the operation amount upper limit value.

3. The motor control device according to claim 1, wherein with the first value calculated by the hardware processor being a P term and the second value calculated by the hardware processor being an I term, the hardware processor is configured to calculate the operation amount so that PI control is realized.

4. The motor control device according to claim 2, wherein with the first value calculated by the hardware processor being a P term and the second value calculated by the hardware processor being an I term, the hardware processor is configured to calculate the operation amount so that PI control is realized.

5. The motor control device according to claim 1, wherein the motor is used for a hydraulic pump.

6. The motor control device according to claim 2, wherein the motor is used for a hydraulic pump.

7. The motor control device according to claim 3, wherein the motor is used for a hydraulic pump.

8. A motor drive system comprising:
a motor; and
the motor control device according to claim 1 controlling the motor.

9. A hydraulic pressure generator comprising:
a hydraulic pump;
a motor that drives the hydraulic pump; and
the motor control device according to claim 1 controlling the motor.

10. A motor control method used by a motor control device comprising a hardware processor configured to execute steps comprising:
acquiring a target value of a control parameter associated with a motor;
calculating an operation amount for the motor;
acquiring an output of the control parameter outputted from the motor when the motor is driven based on the operation amount which has been calculated;
calculating a deviation between the target value which has been acquired and the output which has been acquired,
wherein calculating the operation amount for the motor comprises:
    calculating a first value by multiplying the deviation which has been calculated with a proportional gain;
    calculating a second value in a range that does not exceed a predetermined upper limit value based on an integrated value obtained by integrating the deviation over time; and
    calculating the operation amount in a range that does not exceed an operation amount upper limit value based on the first value which has been calculated and the second value which has been calculated, wherein the predetermined upper limit value is larger than a value obtained by subtracting the first value which has been calculated from the operation amount upper limit value; and
driving the motor according to the operation amount, wherein the predetermined upper limit value is set within an upper bound and a lower bound respective to the operation amount upper limit value.

11. A non-transitory computer readable storage medium, storing a motor control program causing a hardware processor of a motor control device to execute:
acquiring a target value of a control parameter associated with a motor;
calculating an operation amount for the motor;
acquiring an output of the control parameter outputted from the motor when the motor is driven based on the operation amount which has been calculated;
calculating a deviation between the target value which has been acquired and the output which has been acquired,
wherein calculating the operation amount for the motor comprises:
    calculating a first value by multiplying the deviation which has been calculated with a proportional gain;
    calculating a second value in a range that does not exceed a predetermined upper limit value based on an integrated value obtained by integrating the deviation over time; and
    calculating the operation amount in a range that does not exceed an operation amount upper limit value based on the first value which has been calculated and the second value which has been calculated, wherein the predetermined upper limit value is larger than a value obtained by subtracting the first value which has been calculated from the operation amount upper limit value; and
driving the motor according to the operation amount, wherein the predetermined upper limit value is set within an upper bound and a lower bound respective to the operation amount upper limit value.

12. The motor control device of claim 1, wherein the upper bound is +10 percent and the lower bound is −10 percent.

* * * * *